United States Patent
Lee

(10) Patent No.: US 9,846,502 B2
(45) Date of Patent: Dec. 19, 2017

(54) TOUCH SENSOR AND DISPLAY APPARATUS INCLUDING THE SAME

(71) Applicant: Dongbu HiTek Co., Ltd., Bucheon-si (KR)

(72) Inventor: Dong Hoon Lee, Geoje-si (KR)

(73) Assignee: Dongbu Hitek Co., Ltd., Bucheon-si (KR)

(*) Notice: Subject to any disclaimer, the term of this patent is extended or adjusted under 35 U.S.C. 154(b) by 33 days.

(21) Appl. No.: 15/045,127

(22) Filed: Feb. 16, 2016

(65) Prior Publication Data

US 2016/0370926 A1    Dec. 22, 2016

(30) Foreign Application Priority Data

Jun. 19, 2015 (KR) .................. 10-2015-0087674

(51) Int. Cl.
G06F 3/041 (2006.01)
G06F 3/044 (2006.01)

(52) U.S. Cl.
CPC ............ G06F 3/0412 (2013.01); G06F 3/044 (2013.01); G06F 3/0418 (2013.01)

(58) Field of Classification Search
CPC ....... G06F 3/0412; G06F 3/0418; G06F 3/044
See application file for complete search history.

(56) References Cited

U.S. PATENT DOCUMENTS

| | | | |
|---|---|---|---|
| 7,932,898 B2 | 4/2011 | Philipp et al. | |
| 9,250,751 B2 | 2/2016 | Philipp et al. | |
| 2007/0062739 A1 | 3/2007 | Philipp et al. | |
| 2008/0278427 A1* | 11/2008 | Jang | G09G 3/3688 345/98 |
| 2011/0199333 A1 | 8/2011 | Philipp et al. | |
| 2014/0232691 A1* | 8/2014 | Lee | G06F 3/044 345/174 |
| 2014/0292679 A1* | 10/2014 | Kida | G06F 3/041 345/173 |

FOREIGN PATENT DOCUMENTS

| | | |
|---|---|---|
| KR | 1020070032924 A | 3/2007 |
| KR | 101295110 B1 | 8/2013 |
| KR | 101323044 B1 | 10/2013 |

OTHER PUBLICATIONS

Office Action dated Sep. 23, 2016 for Korean Patent Application No. 10-2015-0087674; 4 pgs.; Korean Intellectual Property Office, Republic of Korea.

(Continued)

*Primary Examiner* — Insa Sadio

(74) *Attorney, Agent, or Firm* — Andrew D. Fortney; Central California IP Group, P.C.

(57) ABSTRACT

A touch sensor is disclosed. The touch sensor includes a touch panel including a plurality of sensing nodes in columns and rows and sensing lines connected to the sensing nodes, a touch sensing unit configured to provide a driving signal to at least one of sensing lines to charge at least one of the sensing nodes during a first time period and discharge voltages on the sensing nodes during a second period, and a charge sharer or equalizer configured to short-circuit the sensing lines during the second time period.

18 Claims, 10 Drawing Sheets

(56) References Cited

OTHER PUBLICATIONS

Sang Hyun Han; "Capacitance Measuring Circuit of a Touch Sensor and Capacitance Type Touch Panel"; Abstract of Korean Publication 101295110; Publication Date: Aug. 9, 2013; http://kpa.kipris.or.kr.
Philipp Harald ; "Capacitor Touch Sensor"; Abstract of Korean Publication 10-2007-0032924; Publication Date: Mar. 23, 2007; http://kpa.kipris.or.kr.
Sung Yub Lee; "Touch Sensing Apparatus and Driving Method Thereof"; Abstract of Korean Publication 101323044; Publication Date: Oct. 29, 2013; http://kpa.kipris.or.kr.

* cited by examiner

TOUCH SENSOR AND DISPLAY APPARATUS INCLUDING THE SAME

This application claims the benefit of Korean Patent Application No. 10-2015-0087674, filed on Jun. 19, 2015, which is hereby incorporated by reference as if fully set forth herein.

BACKGROUND OF THE INVENTION

Field of the Invention

The present invention relates to a touch sensor and a display apparatus including the same.

Discussion of the Related Art

A touch sensor is a device for allowing a human finger or other contact mechanism to contact a character or a figure displayed on a screen of a display apparatus so as to input a user command and is attached onto an image display apparatus. The touch sensor converts a contact point of a human finger or the like into an electrical signal and uses the converted electrical signal as an input signal.

A method for implementing a touch sensor may include a resistive method, an optical sensing method, a capacitive method, and so on. A touch sensor in the capacitive method detects a change in capacitance formed between a human finger and at least one conductive detection pattern, a ground electrode, or the like during contact with the human finger or an object, and converts the contact point into an electrical signal.

For convenience of use and sophisticated design aesthetics, a touchscreen-type display module including a touch sensor for input has also been preferred for an automated teller machine (ATM) device, common home appliances, such as a television (TV), and portable electronic devices, such as a cellular phone.

Recently, for thinner portable terminals, an in-cell-type display apparatus configured by installing elements constituting a touchscreen in a display device has been developed.

SUMMARY OF THE INVENTION

Accordingly, embodiments of the present invention are directed to a touch sensor and a display apparatus including the same that substantially obviate one or more problems due to limitations and disadvantages of the related art.

An object of the present invention is to provide a touch sensor and a display apparatus including the same, for enhancing sensitivity and accuracy of touch sensing.

Additional advantages, objects, and features of the invention will be set forth in part in the description which follows and in part will become apparent to those skilled in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose(s) of the invention, as embodied and broadly described herein, a touch sensor may include a touch panel comprising a plurality of sensing nodes in columns and rows and sensing lines connected to the sensing nodes, a touch sensing unit configured to (i) provide a driving signal to at least one of sensing lines (for example, to charge at least one of the sensing nodes) in a first time period and (ii) discharge a voltage on the sensing nodes in a second time period, and a charge sharer or equalizer configured to short-circuit the sensing lines in the second period.

The driving signal may be a cyclic or periodic signal, and the first period may be a length of time during which the sensing lines are charged by the driving signal.

Discharging the voltages on the sensing nodes and short-circuiting the sensing lines may be simultaneously performed in the second period.

Alternatively, discharging the voltages on the sensing nodes and short-circuiting the sensing lines may be sequentially performed in the second period.

The touch sensing unit may include a driving signal generator configured to generate the driving signal, a first switch connected between the driving signal generator and the sensing lines, and a second switch connected between the sensing lines and a ground potential. During the first period, the first switch may be turned on in response to a first switch control signal, and the second switch may be turned off in response to a second switch control signal. In addition, during the second period, the first switch may be turned off in response to the first switch control signal, and the second switch may be turned on in response to the second switch control signal.

The touch sensing unit may include a sensing end configured to sample a voltage on the sensing node connected to a corresponding one of the sensing lines and perform a sensing operation using the sampled voltage.

The equalizer may short-circuit two adjacent sensing lines in the second period.

The equalizer may further include a connection switch configured to short-circuit one of sensing lines connected to the sensing nodes corresponding to one of the columns and another one of sensing lines connected to the sensing nodes corresponding to another one of the columns in the second period.

The first and second periods may be sequential and/or consecutive.

The equalizer may include charge-sharing switches configured to short-circuit two adjacent sensing lines in response to one or more sharing control signals. A turn-off time of the charge-sharing switches may be later than the turn-off time of the second switch.

In another aspect of the present invention, a display apparatus may include a panel driver configured to divide a display operation and a touch sensing operation in terms of time during one frame, a touch sensing unit configured to (i) provide a driving signal to at least one of sensing lines to charge at least one of the sensing nodes in a first period and (ii) discharge a voltage charged in the sensing nodes in a second period, and an equalizer or charge sharer configured to short-circuit the sensing lines in the second period.

The driving signal may be a cyclic or periodic signal, and the first period may be a length of time during which the sensing nodes are charged with the driving signal.

The panel may include display electrodes configured to display driving and display pixels connected to the display electrodes. In addition, the sensing node may be any one of the display electrodes.

The display apparatus may further include a data driver configured to drive the data lines, and a gate driver configured to drive the gate lines.

A guarding signal may be provided to at least one of other display electrodes except for the sensing nodes of the display electrodes during the touch sensing operation. In addition, the guarding signal may be the same as the driving signal.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle(s) of the invention. In the drawings.

DETAILED DESCRIPTION OF THE INVENTION

Figure 1:
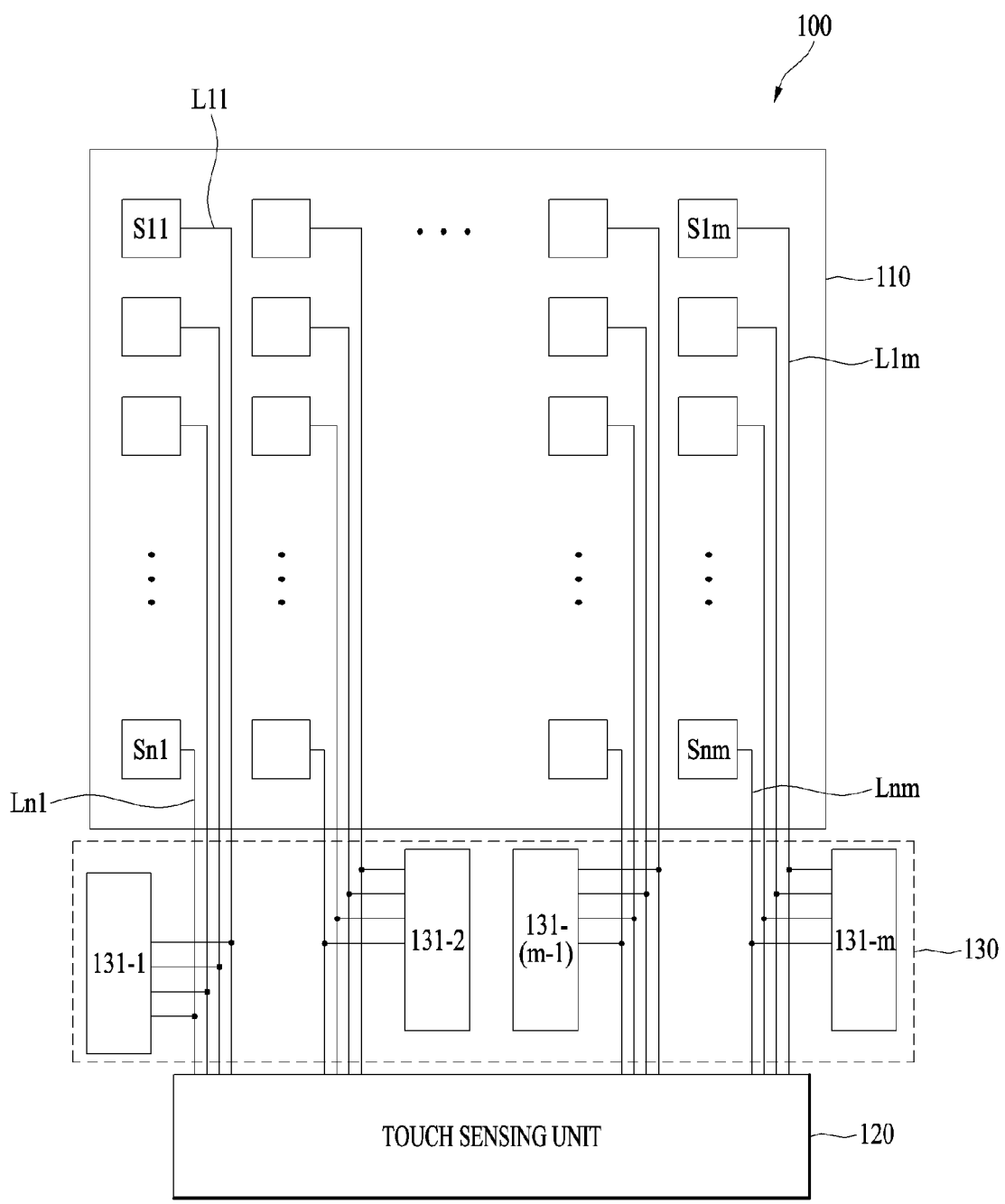
FIG. 1 is a block diagram of an exemplary touch sensor according to one or more embodiments of the present invention.

Reference will now be made in detail to various embodiments of the present invention, examples of which are illustrated in the accompanying drawings. In description of elements, it will be understood that when an element or layer is referred to as being "on" or "under" another element or layer, the element or layer can be directly on or under another element or layer or intervening elements or layers, and criteria for "on" and "under" should be understood on the basis of the drawings.

Elements in the following drawings may be exaggerated, omitted, or schematically illustrated for conveniences and clarity of explanation, and the sizes of elements do not reflect their actual sizes completely. In addition, the same reference numerals in the drawings generally denote the same or similar constituent elements.

FIG. 1 is a block diagram of an exemplary touch sensor 100 according to one or more embodiments of the present invention.

Referring to FIG. 1, the exemplary touch sensor 100 may include a touch panel 110, a touch sensing unit 120, and a charge sharer or equalizer 130.

The touch panel 110 may function substantially independently and include a plurality of sensing nodes S11 to Snm, where n and m are integers, each being a natural number greater than 1 and sensing lines L11 to Lnm, where n and m are integers, each being a natural number greater than 1. The sensing nodes S11 to Snm and the sensing lines L11 to Lnm are at different locations.

The sensing nodes S11 to Snm (n and m each being a natural number greater than 1) may be interchangeably used with terms such as a sensor pad, coordinates, sensing points, nodes, or a sensing node array.

The sensing nodes S11 to Snm (n and m each being a natural number greater than 1) may be arranged in a matrix form having rows and columns, without being limited thereto.

For example, the touch panel 110 may include an electrode pattern layer (not shown) having sensor pads that are spaced apart from each other, a substrate (not shown) in front of, on, above or below the electrode pattern layer, and an insulating layer (not shown) behind, on, below or above the electrode pattern layer.

The electrode pattern layer may comprise or be formed from at least one transmissive or transparent conductive material. For example, the transmissive or transparent conductive material may comprise or consist of indium tin oxide (ITO), tin oxide (TO), indium zinc oxide (IZO), indium tin zinc oxide (ITZO), indium aluminum zinc oxide (IAZO), indium gallium zinc oxide (IGZO), indium gallium tin oxide (IGTO), aluminum zinc oxide (AZO), antimony tin oxide (ATO), gallium zinc oxide (GZO), carbon nanotubes (CNT), a conductive polymer, and/or a silver (Ag) or copper (Cu) transparent ink.

The electrode pattern layer may be on one or more layers of glass or plastic, and be formed by conventional coating and patterning, to form the sensing node arrays S11 to Snm (n and m each being a natural number greater than 1).

The substrate may be or comprise a dielectric film having a high light transmittance. The substrate may include at least one of, for example, glass, polyethylene terephthalate (PET), polyethylene naphthalate (PEN), a polyimide (PI), and a polyacrylate.

The insulating layer may include a transmissive or transparent insulating layer, such as a PET layer or the like. According to one or more other embodiments of the present invention, a shielding layer (not shown) may be below the insulating layer, configured to remove electromagnetic interference (EMI) and noise that may otherwise be introduced into the electrode pattern layer.

One or more layers of the touch panel 110 may be merged with at least one layer of the display according to one or more panel design methods. Alternatively, a touch panel that is not merged with the display may include a 2D sensing node array (which may be implemented using an appropriate method). Embodiments of the present invention may be applied to any touch sensing system including a 2D sensing node array.

Each of the sensing lines L11 to Lnm (n and m each being a natural number greater than 1) may be connected to at least one of the sensing nodes S11 to Snm (n and m each being a natural number greater than 1). For example, one sensing line may be electrically connected to a corresponding one of the sensing nodes S11 to Snm (n and m each being a natural number greater than 1).

The sensing lines L11 to Lnm (n and m each being a natural number greater than 1) may function as both a driving line for driving the sensing nodes S11 to Snm (n and m each being a natural number greater than 1) and a sensing line for detecting whether a touch occurs or is performed, without being limited thereto. Thus, according to one or more embodiments of the present invention, the driving line and the sensing line may be separated.

The touch sensing unit 120 may be electrically connected to the sensing lines L11 to Lnm (n and m each being a natural number greater than 1) and may provide a driving signal to at least one of the sensing lines L11 to Lnm (n and m each being a natural number greater than 1). For example, the driving signal may be a pulse, an alternating current (AC) current, or a voltage signal. In addition, the driving signal may be a cyclic or periodic signal.

The touch sensing unit 120 may sequentially provide the driving signal to the sensing lines L11 to Lnm (n and m each being a natural number greater than 1), or may simultaneously provide the driving signal to two or more sensing lines. For example, the touch sensing unit 120 may simultaneously provide the driving signal to sensing lines connected to the sensing nodes corresponding to each column.

Here, the term "simultaneously" may refer to precisely simultaneous cases, as well as nearly or substantially simultaneous cases. For example, a "simultaneous" case may refer to a case that begins and ends almost simultaneously and/or a case in which the time periods at least partially overlap each other.

Figure 4:
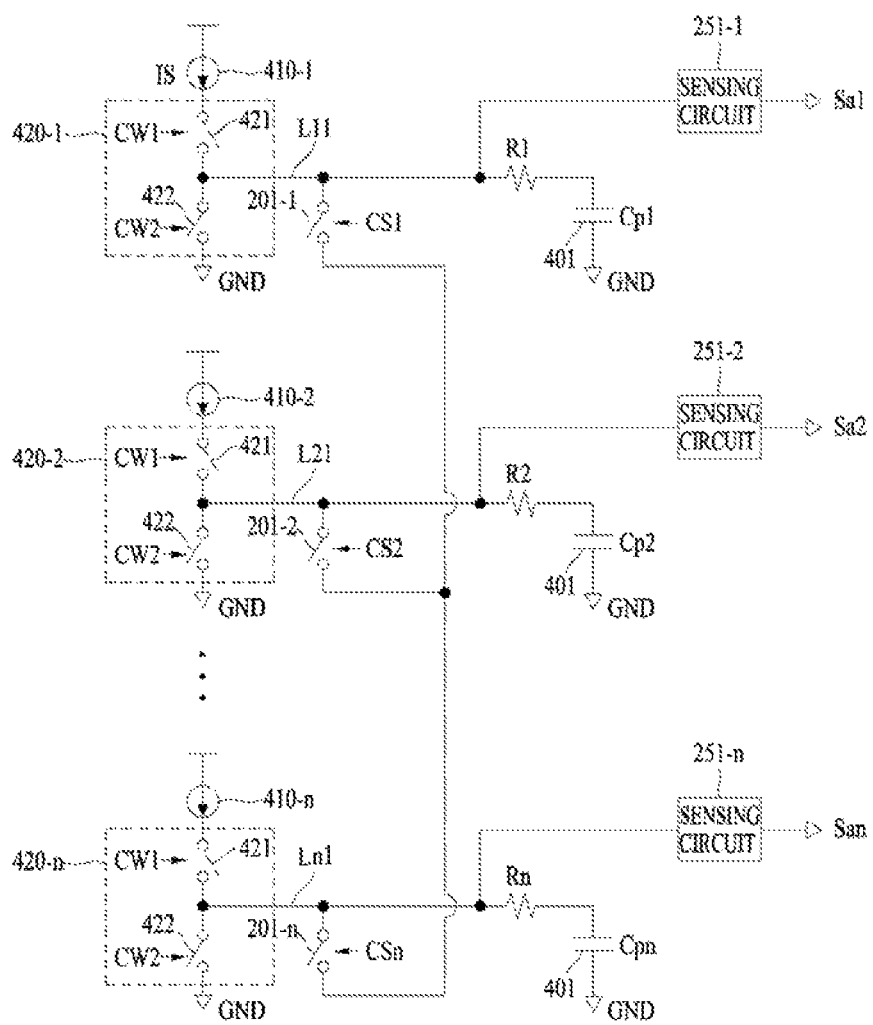
FIG. 4 is a diagram illustrating the exemplary touch sensor of FIG. 1 according to one or more embodiments of the present invention.

FIG. 4 is a diagram illustrating an embodiment of the exemplary touch sensing unit 120 of FIG. 1.

FIG. 4 illustrates a portion of the exemplary touch sensing unit 120 for sensing one column of the touch panel 110. The remaining portion(s) of the touch panel 110 corresponding to the other columns of the touch panel 110 may be the same as or similar to the column shown in FIG. 4.

Referring to FIG. 4, the touch sensing unit 120 may include driving signal generators 410-1 to 410-$n$ (n being a natural number greater than 1) configured to generate a driving signal IS, driving signal providers 420-1 to 420-$n$ (n being a natural number greater than 1) configured to provide the driving signal IS to the sensing lines L11 to Lnm (n and m each being a natural number greater than 1) a panel capacitors Cp1-Cpn, and sensing terminals 251-1 to 251-$n$ (n being a natural number greater than 1). In one embodiment, the driving signal generators 410-1 to 410-$n$ are or comprise one or more current sources.

The touch sensing unit 120 may further include a multiplexer (not shown) for selectively transmitting the driving signal IS from the driving signal generators 410-1 to 410-$n$ (n being a natural number greater than 1) to the sensing lines L11 to Ln1 connected to sensing nodes S11 to Sn1 corresponding to a column (e.g., the first column) of the touch panel 110. In addition, the multiplexer (not shown) may sequentially or simultaneously provide the driving signal IS to a plurality of the columns.

The driving signal IS generated by the driving signal generators 410-1 to 410-$n$ (n being a natural number greater than 1) may be simultaneously or sequentially provided to the sensing lines connected to the sensing nodes (e.g., S11 to Sn1) corresponding to a column (e.g., the first column) selected by the multiplexer.

A panel capacitor 401 may be connected between the sensing lines (e.g., L11 to Ln1) and a ground potential GND. The panel capacitor 401 may be a driving capacitor of a sensing node, charged by the driving signal IS.

Capacitances Cp1 to Cpn of the panel capacitor 401 may include a parasitic capacitance between the sensing lines (e.g., L11 to Ln1) and the ground potential GND (e.g., a ground plane), as well as the capacitance of the corresponding driving capacitor. R1 to Rn may be the resistance of the sensing lines L11 to Ln1.

The driving signal providers 420-1 to 420-$n$ (n being a natural number greater than 1) may provide the driving signal IS from a driving signal generator (e.g., 410-1) to a sensing line (e.g., L11) to charge a sensing node, or discharge a voltage on the sensing node to the ground potential GND.

For example, the driving signal providers 420-1 to 420-$n$ (n being a natural number greater than 1) may provide the driving signal IS to the sensing lines L11 to Ln1 during a first time period P1 (see, e.g., FIG. 5), and the sensing nodes connected to the sensing lines L11 to Ln1 may be charged with voltages Vd1 to Vdn by the driving signal IS. In such a case, the voltages Vd1 to Vdn may be determined according to the capacitance of the panel capacitor 401 and a touch capacitance between a touch pressure object (e.g., a finger or stylus) and the sensing nodes S11 to Sn1 (n being a natural number greater than 1).

In addition, the driving signal providers 420-1 to 420-$n$ (n being a natural number greater than 1) may discharge the voltages Vd1 to Vdn on the sensing lines to the ground potential GND driving a second time period P2 (see, e.g., FIG. 5), after the first time period P1.

The first time period P1 may be a period during which the driving signal charges a corresponding sensing node, and the second time period P2 may be a period during which the voltage on the sensing node (e.g., that was charged during the first time period) is discharged. The first and second time periods P1 and P2 may be serial and consecutive, and in some embodiments, periodically.

The driving signal providers 420-1 to 420-$n$ (n being a natural number greater than 1) may include a first switch 421 connected between the driving signal generators 410-1 to 410-$n$ and the sensing lines L11 to Ln1, and a second switch 422 connected between the ground GND and the corresponding sensing line (e.g., L11).

The first switch 421 may be activated (e.g., turned on or closed) in response to a first switch control signal CW1, and the second switch 422 may be activated (e.g., turned on or closed) in response to the second switch control signal CW2.

When activating the first and second switches 421 and 422, charging may be performed during the first time period P1, and discharging may be performed during the second time period P2.

Each of the sensing terminals 251-1 to 251-$n$ (n being a natural number greater than 1) may sample the voltage on a sensing node connected to a corresponding one of the sensing lines L11 to Ln1 (n being a natural number greater than 1) and sense (e.g., perform a sensing operation using) the sampled voltage Sa1 to San (n being a natural number greater than 1).

For example, each of the sensing terminals 251-1 to 251-n (n being a natural number greater than 1) may include a sample-and-hold block. The sample-and-hold block may sample the voltage on the corresponding sensing node immediately before the sensing node is discharged, and maintain the sampled voltage Sa1 to San (n being a natural number greater than 1), thereby performing the sensing operation.

For example, each of the sensing terminals 251-1 to 251-n (n being a natural number greater than 1) may perform amplify, analog input signal to a digital output signal, process the digital signal, and the like on the sampled voltage Sa1 to San (n being a natural number greater than 1) in the sample-and-hold block, so as to detect a variation and/or the amount of capacitance or charge on the sensing nodes S11 to Snm.

For example, the touch sensing unit 120 may further include an amplifier configured to amplify the voltages Sa1 to San (n being a natural number greater than 1) sampled by the sample-and-hold block, an analog-to-digital converter receiving an output of the amplifier configured to convert an analog input signal to a digital output signal, and/or a digital signal processor configured to detect a variation amount of charge on and/or capacitance of the sensing nodes by processing the digital signal.

The equalizer 130 may short-circuit two or more the sensing lines L11 to Lnm (n and m each being a natural number greater than 1). For example, the equalizer 130 may short-circuit two adjacent ones sensing lines of the sensing lines L11 to Lnm (n and m each being a natural number greater than 1) during the second time period P2.

For example, the equalizer 130 may short-circuit the sensing lines (e.g., L11 to Ln1) connected to sensing nodes in given column of the touch panel 110. Separately (e.g., successively) or together, the equalizer 130 may short-circuit the sensing lines (e.g., L22 to Ln2) in each of the remaining columns.

The equalizer 130 may include a plurality of switch circuits 131-1 to 131-m (m being a natural number greater than 1).

A plurality of switch circuits 131-1 to 131-m (m being a natural number greater than 1) may short-circuit sensing lines connected to sensing nodes corresponding to a corresponding one of columns of the touch panel 110, respectively.

Each of the switch circuits 131-1 to 131-m (m being a natural number greater than 1) may include a plurality of shared switches.

Figure 2:
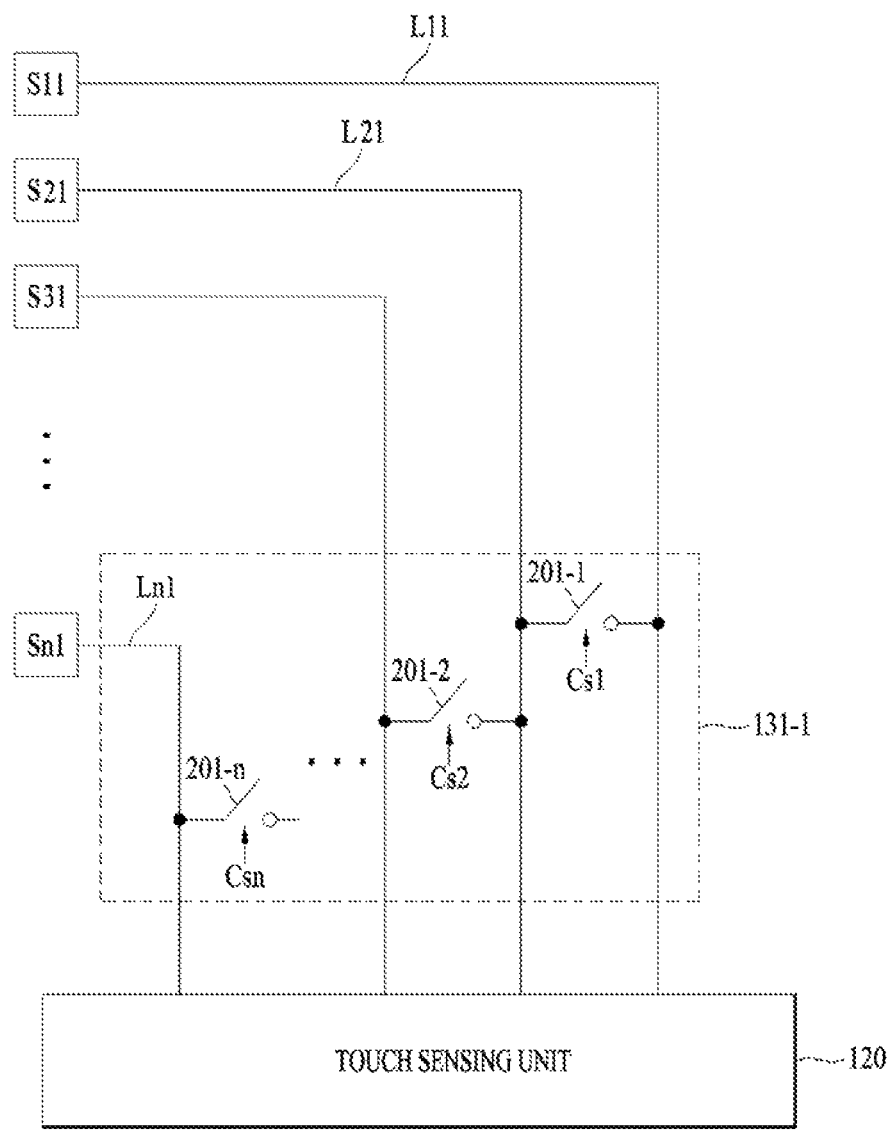
FIG. 2 is a diagram of an exemplary first switch circuit illustrated in FIG. 1, according to one or more embodiments of the present invention.

FIG. 2 is a diagram of an exemplary first switch circuit 131-1 illustrated in FIG. 1, according to embodiments of the present invention.

Referring to FIG. 2, the exemplary first switch circuit 131-1 may include a plurality of shared switches 201-1 to 201-n (n being a natural number greater than 1) that are activated (e.g., turned on or closed) in response to sharing control signals Cs1 to Csn (n being a natural number greater than 1).

Each of the shared switches 201-1 to 201-n (n being a natural number greater than 1) may be connected between two adjacent sensing lines of sensing lines (e.g., L11 to Ln1) connected to sensing nodes (e.g., S11 to Sn1) that correspond to each column (e.g., a first column) of the touch panel 110.

For example, the shared switches 201-1 to 201-n (n being a natural number greater than 1) may be simultaneously turned on and sensing lines (e.g., L11 to Ln1) may be short-circuited in the second time period P2.

Although FIG. 2 illustrates only the first switch circuit 131-1, the other switch circuits 131-2 to 131-m of FIG. 1 may also be arranged in the same way, so as to perform the same function or operation as the first switch circuit 131-1.

Figure 5:
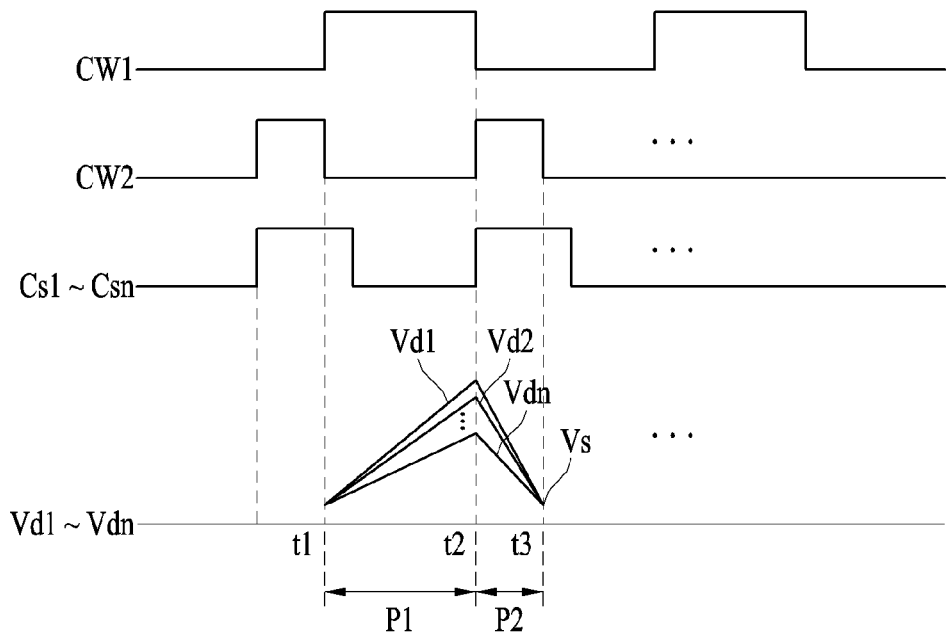
FIG. 5 is a timing diagram of the exemplary first and second switch control signals, sharing control signals, and driving signals, according to one or more embodiments of the present invention.

FIG. 5 is a timing diagram of the exemplary first and second switch control signals CW1 and CW2, the sharing control signals Cs1 to Csn, and driving signals Vd1 to Vdn, according to embodiments of the present invention.

Referring to FIG. 5, in the first time period P1, the first switch control signal CW1 may be at a first level (e.g., a high level), a second switch control signal CW2 may be at a second level (e.g., a low level), and the sharing control signals Cs1 to Csn may be at the second level (e.g., the low level).

The first time period P1 may be a length of time during which a sensing node is charged by the driving signal IS.

In the second time period P2 after the first time period P1, the first switch control signal CW1 may be at the second level (e.g., the low level), and the second switch control signal CW2 and the sharing control signals Cs1 to Csn may be at the first level (e.g., the high level).

In the second time period P2, the voltages Vd1 to Vdn charged in the sensing nodes may be discharged and the sensing lines may be short-circuited. For example, in the second time period P2, discharging the voltages charged in the sensing nodes and short-circuiting of the sensing nodes may be simultaneously performed or discharging of the charged voltages Vd1 to Vdn may be performed prior to short-circuiting the sensing nodes.

A first level of the second switch control signal CW2 and a first level of the sharing control signals Cs1 to Csn may at least partially overlap.

For example, the second switch control signal CW2 and the sharing control signals Cs1 to Csn may be synchronized with each other and may have the same phase.

For example, the second switch CW2 and the shared switches 201-1 to 201-n (n being a natural number greater than 1) may be simultaneously turned on. Alternatively, a start time or a turn-on signal of the second switch CW2 may be earlier than the start time or the turn-on signal of the shared switches 201-1 to 201-n (n being a natural number greater than 1).

In order to smoothly perform a charge sharing operation, an end or stop time of the charge sharing operation may be later than end or stop time of a discharging operation of sensing nodes.

For example, in the first time period P1, the turn-off or stop time of the shared switches 201-1 to 201-n (n being a natural number greater than 1) or a fall time of the sharing control signals Cs1 to Csn may be later than a turn-off or stop time of the second switch CW2 or a fall time of the second switch control signal CW2.

As the second switch CW2 is turned on, the charged voltages Vd1 to Vdn of the sensing nodes corresponding to each column of the touch panel 110 may be discharged. Simultaneously, as the shared switches 201-1 to 201-n (n being a natural number greater than 1) are turned on, the sensing lines L11 to Ln1 may be short-circuited and sensing nodes corresponding to each column of the touch panel 110 may be equalized.

Since the sensing lines L11 to Ln1 may have different wiring lengths, wiring resistances R1 to Rn may be different. As sensing nodes begin to be charged, the same driving signal may be applied to the sensing lines having different resistance values. Thus, the voltages values applied to the sensing lines at the start time of charging may be different.

For example, since a distant sensing node with a long sensing line has a high resistance value, a start voltage of the sensing node may be relatively great, and a start voltage of a close sensing node may be relatively small.

Charge sharing or equalizing with respect to sensing nodes may be performed in order to prevent start voltages of sensing nodes from being changed at a charging time (e.g., a rise time of the CW1).

The capacitances Cp1 to Cpn of the panel capacitors 401 may not be uniform due to difference in positions of the sensor patterns, lengths of the sensor lines, or the parasitic capacitance. Thus, the voltages Vd1 to Vdn charged in the sensing nodes may not be uniform or the same.

Through discharging and charge sharing or equalizing simultaneously in the second time period P2, the charged voltages Vd1 to Vdn of sensing nodes of sensing lines (e.g., L11 to Ln1) may converge on the same sharing voltage Vs or may become uniform.

As described above, when a number of cycles of a touch operation are completed during the touch operation, charges stored in the sensing nodes S11 to Snm may be discharged, and in this regard, sensing lines of each column of the touch panel 110 may be short-circuited prior to a next touch operation. Thus, according to one or more embodiments of the present invention, an initial state between sensing lines of each column, for example, amplitudes of initial voltages may be equalized, thereby enhancing sensitivity and accuracy of touch sensing.

Although FIG. 5 illustrates only charging and discharging of a sensing node in one period, the description of FIG. 5 may be applied to charging, discharging, and charge sharing (e.g., charge equalizing) in a sensing period of all periods in the same way.

Figure 6:
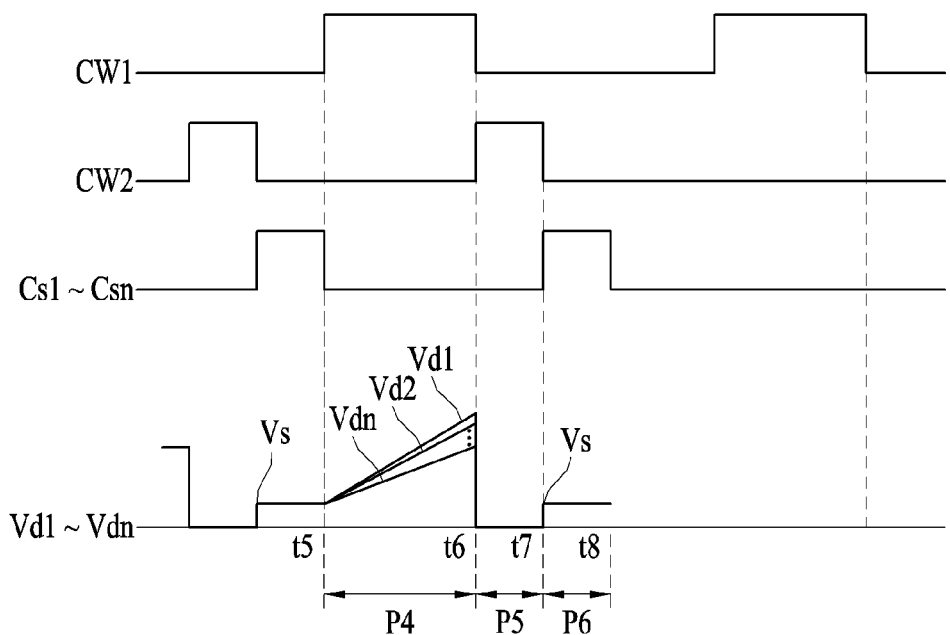
FIG. 6 is a timing diagram of alternative exemplary first and second switch control signals, sharing control signals, and driving signals, according to one or more other embodiments of the present invention.

FIG. 6 is a timing diagram of the exemplary first and second switch control signals CW1 and CW2, the sharing control signals Cs1 to Csn, and the driving signals Vd1 to Vdn, according to one or more other embodiments of the present invention.

Referring to FIG. 6, an operation in a first time period P4 may be the same as in the first time period P1 described with reference to FIG. 5 above.

Unlike in FIG. 5, discharging of voltages charged in sensing nodes and short-circuit of sensing lines in a second time period P6 of FIG. 6 may be sequentially performed. For example, short-circuit of the sensing lines may be performed after a discharging operation for the sensing nodes is completed.

In a first half t6 to t7 of the second time period P6, the first switch control signal CW1 may maintain at a second level (e.g., a low level), the second switch control signal CW2 may be at a first level (e.g., a high level), and the sharing control signals Cs1 to Csn may be at the second level (e.g., the low level).

In the first half t6 to t7 of the second time period P6, charged voltages Vd1 to Vdn of sensing nodes may be discharged.

In a second half t7 to t8 of the second time period P6, the first switch control signal CW1 may maintain at the second level (e.g., the low level), the second switch control signal CW2 may be at the second level (e.g., the low level), and the sharing control signals Cs1 to Csn may be at the first level (e.g., the high level).

In the second half t7 to t8 of the second time period P6, voltages of sensing nodes may converge on a sharing voltage Vs or may become uniform via charge sharing or equalizing.

Although FIG. 6 illustrates that a first half and a second half of the second time period P6 do not temporally overlap, according to one or more embodiments of the present invention, the front half and second half of the second time period P6 may partially overlap.

FIG. 5 illustrates that discharging of the charged voltage on the sensing nodes and charge sharing of the sensing lines may be simultaneously performed during the second time period P2, but FIG. 6 illustrates that charge sharing of the sensing lines may be performed after discharging of the charged voltage on the sensing nodes during the second time period P6.

In FIGS. 5 and 6, a ground potential GND is used to discharge the sensing nodes, without being limited thereto. Thus, according to one or more embodiments of the present invention, a constant reference voltage lower than the charged voltages of the sensing nodes may be used.

The equalizer 130 may short-circuit one or more of the sensing lines connected to the sensing nodes corresponding to any of the columns of the touch panel 110 and any of the sensing lines connected to the sensing nodes corresponding to another column during the second time period P2.

Although FIG. 6 illustrates only charging and discharging of a sensing node in one (e.g., the first) period, the description of FIG. 6 may be applied to charging, discharging, and charge sharing or equalization in a sensing period of each frame in the same way.

Figure 3:
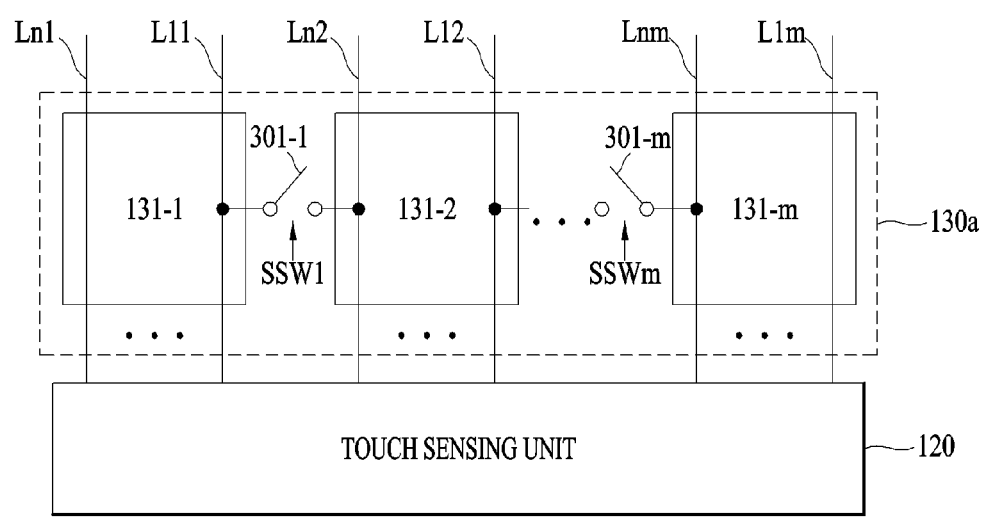
FIG. 3 is a diagram illustrating an exemplary equalizer or charge sharer according to one or more embodiments of the present invention.

FIG. 3 is a diagram illustrating an exemplary charge sharer or equalizer 130a suitable for use as the charge sharer or equalizer 130 illustrated in FIG. 1. The same reference numerals as in FIG. 1 denote the same elements, and the same elements may be schematically described or not described.

Referring to FIG. 3, the equalizer 130a may include a plurality of switch circuits 131-1 to 131-m and connection switches 301-1 to 301-m.

The connection switches 301-1 to 301-m may short-circuit sensing lines corresponding to adjacent columns of the touch panel 110.

For example, the connection switches 301-1 to 301-m may be connected between one of the sensing lines connected to the sensing nodes in one column the touch panel 110 and one of the sensing lines connected to the sensing nodes in an adjacent column. The connection switches 301-1 to 301-m may be activated (e.g., turned on or closed) in response to switch control signals SSW1 to SSWm.

Short-circuiting through the connection switches 301-1 to 301-m may be simultaneously performed with discharging of the charged voltage on the sensing nodes or short-circuiting of the sensing lines. For example, short-circuiting through the connection switches 301-1 to 301-m and short-circuiting of the sensing lines may be simultaneously performed.

For example, the switch control signals SSW1 to SSWm may be synchronized with the second switch control signal CW2 of FIG. 5, or at least one of the charge sharing signals Cs1 to Csn. For example, the switch control signals SSW1 to SSWm and the charge sharing signals Cs1 to Csn may be synchronized with each other and may have the same phase.

For example, the switch control signals SSW1 to SSWm and the charge sharing signals Cs1 to Csn of FIG. 6 may be synchronized with each other and may have the same phase.

All of the sensing lines of the touch panel 110 may be short-circuited through the connection switches 301-1 to

301-m so as to equalize (or perform charge sharing on) all of the sensing nodes, thereby further enhancing sensitivity and accuracy of touch sensing according to embodiments of the present invention.

Although a self-capacitance sensing method is described with reference to FIG. 1, without being limited thereto, the description of FIG. 1 may also be applied to a mutual-capacitance sensing method in the same way.

For example, a touch panel of a touch sensor according to one or more embodiments of the present invention may include a plurality of driving lines to which a driving signal may be applied, a plurality of sensing lines that outputs a sensing signal, and a mutual capacitor between neighboring driving lines and sensing lines. The term "mutual capacitor" may also refer to a sensing node. The above description may be applied to a charge sharing or equalization operation of the sensing lines in the same way.

Figure 7:
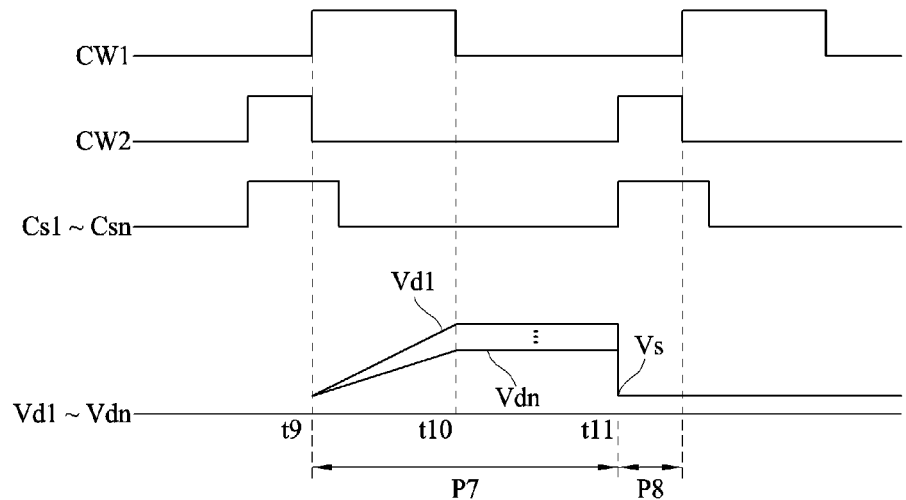
FIG. 7 is a timing diagram of further alternative exemplary first and second switch control signals, sharing control signals, and driving signals, according to one or more further embodiments of the present invention.

FIG. 7 is yet another exemplary timing diagram of the first and second switch control signals CW1 and CW2, the sharing control signals Cs1 to Csn, and the driving signals Vd1 to Vdn, according to one or more embodiments of the present invention.

Referring to FIG. 7, in a first time period P7, the first switch control signal CW1 may be at the first level (e.g., the high level), the second switch control signal CW2 may be at the second level (e.g., the low level), and the sharing control signals Cs1 to Csn may range from the first level (e.g., the high level) to the second level (e.g., the low level).

The first time period P7 may be a length of time during which a sensing node is charged by the driving signal IS.

In the first time period P7, the first switch control signal CW1 may transition to the second level (e.g., the low level) from the first level (e.g., the high level). During a first half t9 to t10 of the first time period P7 in which a level of the first switch control signal CW1 is at the first level, a charging operation may be performed on a sensing node by the driving signal IS. During a second half t10 to t11, in which a level of the first switch control signal CW1 is at the second level, the voltage on the sensing node may be maintained.

In a second time period P8 after the first time period P7, the first switch control signal CW1 may be maintained at the second level (e.g., the low level), and the second switch control signal CW2 and the sharing control signals Cs1 to Csn may be at the first level (e.g., the high level).

In the second time period P8, voltages Vd1 to Vdn on the sensing nodes may be discharged, and the sensing lines may be short-circuited. For example, in the second time period P2, discharging voltages on the sensing nodes and short-circuiting the sensing lines may be simultaneously performed, or discharging the voltages Vd1 to Vdn may be performed prior to short-circuiting the sensing lines.

After discharging the voltages on the sensing nodes, charge sharing or equalizing by short-circuiting the sensing lines may be terminated.

For example, as illustrated in FIG. 7, in order to smoothly perform equalization or a charge sharing operation, the turn-off or stop time of the shared switches 201-1 to 201-n (n being a natural number greater than 1) or the fall time of the sharing control signals Cs1 to Csn may be later than the turn-off or stop time of the second switch CW2 or the fall time of the second switch control signal CW2.

The first level of the second switch control signal CW2 and the first level of the sharing control signals Cs1 to Csn may partially overlap each other.

For example, the second switch CW2 and the shared switches 201-1 to 201-n (n being a natural number greater than 1) may be simultaneously turned on. Alternatively, the start time or turn-on time of the second switch CW2 may be earlier than the start time or turn-on time of the shared switches 201-1 to 201-n (n being a natural number greater than 1).

As the second switch CW2 is turned on, voltages (Vd1 to Vdn) on the sensing nodes of each column of the touch panel 110 may be discharged. Simultaneously, as the shared switches 201-1 to 201-n (n being a natural number greater than 1) are turned on, the sensing lines L11 to Ln1 may be short-circuited, and the sensing nodes of each column of the touch panel 110 may be equalized.

Figure 8:
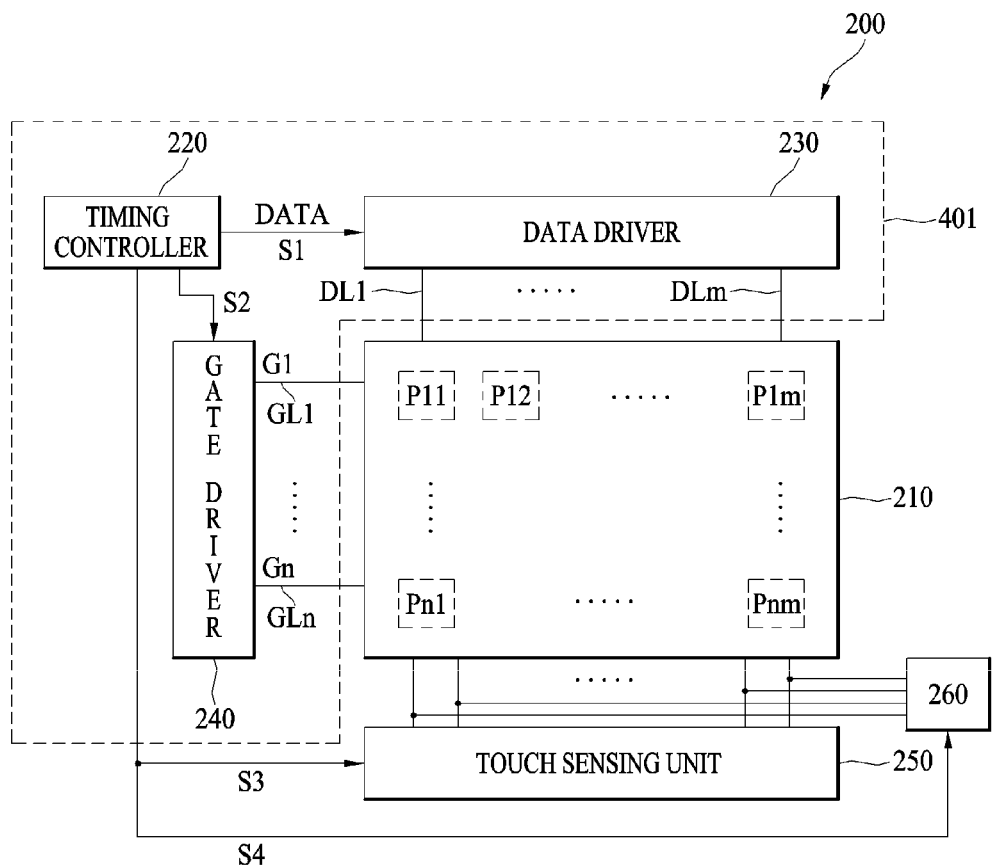
FIG. 8 is a diagram illustrating an exemplary structure of a display apparatus according to one or more embodiments of the present invention.

FIG. 8 is a diagram illustrating a structure of an exemplary display apparatus 200 according to one or more embodiments of the present invention. The display apparatus 200 illustrated in FIG. 8 may be an in-cell type display apparatus.

The display apparatus 200 may include a panel 210, a timing controller 220, a data driver 230, a gate driver 240, a touch sensing unit 250, and a charge sharer or equalizer 260.

The timing controller 220, the data driver 230, and the gate driver 240 may be included in a controller or as a display integrated circuit IC 401. In addition, the touch sensing unit 250 and the equalizer 260 may be included in a touch sensing IC, without being limited thereto.

The display IC 401 may drive the display part of the panel 210 during a display operation, and may drive the touch-sensing part of the panel 210 during a touch sensing operation.

After completing a number of cycles or instances of touch sensing during the touch sensing operation period, the touch sensing IC may discharge the charge on a sensing node for sensing the next touch, In this regard, equalization or a charge sharing operation may be performed on the sensing node prior to sensing the next touch.

The panel 210 may be a display panel including a touch sensing unit or a touchscreen. For example, the panel 210 may be an in-cell type panel using a capacitive method in which display driving and touch driving are time-separated or time-divided during one frame.

Figure 9:
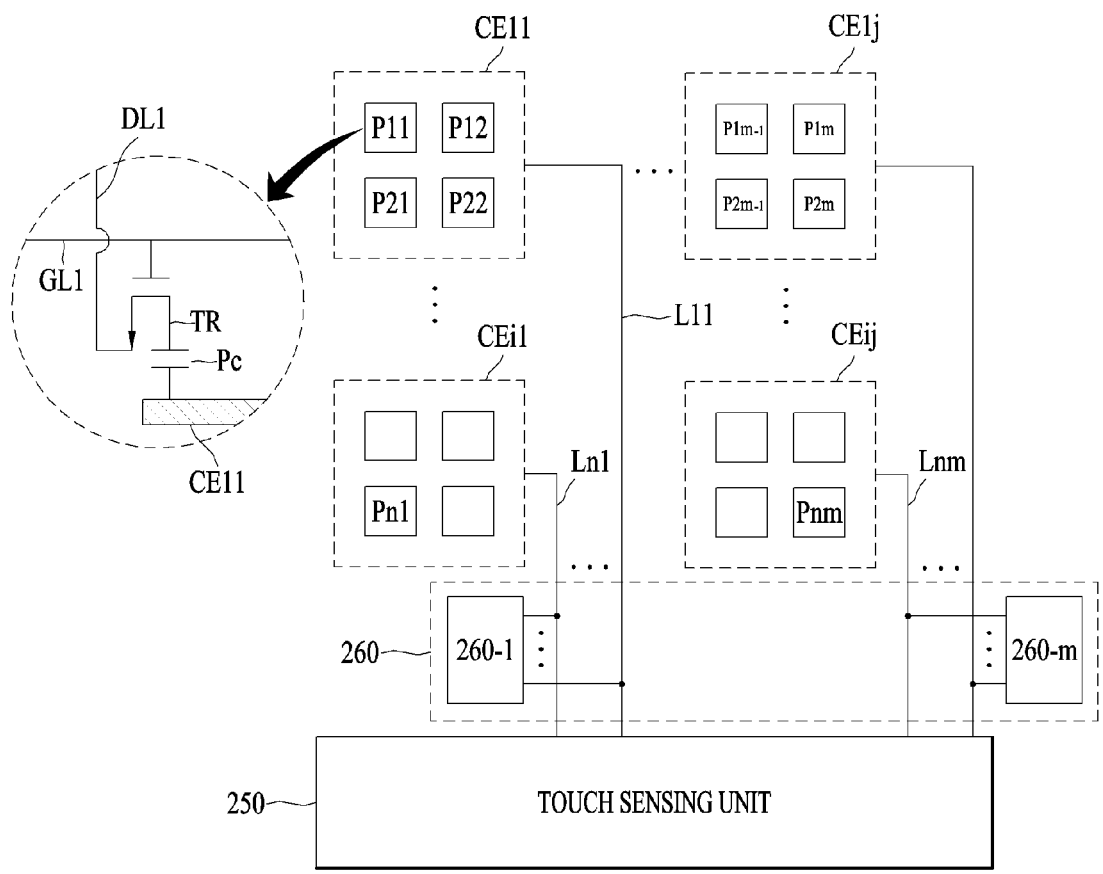
FIG. 9 is a diagram illustrating an exemplary panel suitable for the display apparatus illustrated in FIG. 8, according to one or more embodiments of the present invention.

FIG. 9 is a diagram illustrating an exemplary panel 210 suitable for use as the panel 210 illustrated in FIG. 8, according to one or more embodiments of the present invention.

Referring to FIGS. 8 and 9, the panel 210 may include data lines DL1 to DLm (m being a natural number greater than 1), gate lines GL to GLn (n being a natural number greater than 1), and display pixels P11 to Pnm (n and m each being a natural number greater than 1) for displaying colors.

Each of the display pixels P11 to Pnm (n and m each being a natural number greater than 1) may include a pixel capacitor Pc and a transistor TR. The transistor TR may include a gate (e.g., GL1) connected to a gate line, a drain (or source) connected to a data line (e.g., DL1), and a source (or drain) connected to one end of the pixel capacitor Pc formed by a data line (e.g., DL1) and a gate line (GL1) that cross each other.

In addition, the panel 210 may include a plurality of common electrodes CE11 to CEij (i and j each being a natural number greater than 1; not shown) connected to the other end of the pixel capacitor Pc of the display pixels P11 to Pnm (n and m each being a natural number greater than 1). Although FIG. 8 illustrates the case in which four adjacent pixels (e.g., P11, P12, P21, and P22, or other 2×2 pixel block) share one common electrode, without being limited thereto, and thus various modifications may be made.

For example, the panel 210 may be divided into two or more groups, and each of the two or more groups may include a plurality of display pixels. Display pixels in each group may not overlap each other.

Each of the common electrodes CE11 to CEij (i and j each being a natural number greater than 1) may be commonly connected to other pixel capacitors Pc of the display pixels P11 to P22 corresponding to one of the groups (e.g., CE11).

The common electrodes CE11 to CEij (i and j each being a natural number greater than 1) may be used as an electrode for supplying a common voltage Vcom to the display pixels P11 to Pnm (n and m each being a natural number greater than 1) in order to drive a liquid crystal cell or pixel during a display operation, and may be used as an electrode to which a driving signal is supplied for touch sensing during a touch sensing operation.

For example, during the time period of the touch sensing operation, the common electrodes CE11 to CEij (i and j each being a natural number greater than 1) may function as sensing nodes, coordinates, sensing points, nodes, or a sensing node array.

In addition, touch detection may be achieved using a method for detecting change in self-capacitance between common electrodes or a method for detecting change in mutual capacitance between common electrodes.

Gate lines may also be referred to as "gate electrodes," data lines may also be referred to as "data electrodes," and the gate electrode and the data electrode together may also be referred to as a "display electrode."

The aforementioned panel 210 may be merely an embodiment, and thus according to other embodiments of the present invention, the panel 210 may be included in various types of in-cell type panels.

The timing controller 220 may generate data DATA for driving the panel 210, a first control signal S1 for controlling the data driver 230, a second control signal S2 for controlling the gate driver 240, a third control signal S3 for controlling the touch sensing unit 250, and a fourth control signal S4 for controlling the equalizer 260.

For example, the first control signal S1 may include a horizontal start signal, an enable signal, a clock signal CLK, a horizontal line signal (or a horizontal synchronization signal), or a frame signal (or a vertical synchronization signal) that may be input to a shift register of the data driver 230.

The frame signal may be a signal for defining a frame. For example, the period of a periodic or cyclic frame signal may be set as one frame. In addition, the horizontal line signal may be a signal for defining a period required to write the data to pixels of a line in a pixel array of the panel 210. The period of a periodic or cyclic horizontal line signal may be the horizontal period.

Figure 10:
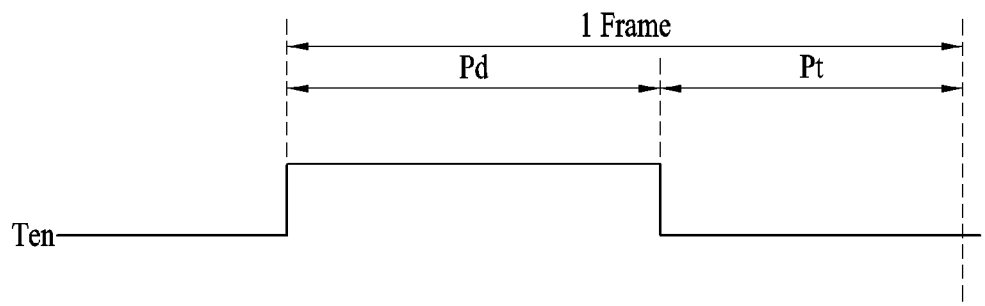
FIG. 10 is a diagram illustrating an exemplary first frame period.

FIG. 10 is a diagram illustrating an exemplary frame period.

Referring to FIG. 10, the frame of the display apparatus 200 may include a time-divided display period Pd and touch sensing period Pt.

The data driver 230 may include a shift register, a latch unit, a level shifter, an analog-digital converter, and an output unit (e.g., an output driver or buffer).

The shift register may generate a shift signal in response to an enable signal and a clock signal in order to control timing for storing the data DATA in the latch unit. The latch unit may store the data DATA in response to the shift signal. The level shifter may convert a voltage level of the data DATA stored in the latch unit. A digital-to-analog converter may convert the digital level-shifted data DATA into an analog signal. The output unit may amplify or buffer the analog signal output from the digital-to-analog converter and output the amplified or buffered analog signal to the data lines DL1 to DLm (m being a natural number greater than 1).

The gate driver 240 may drive the gate lines GL to GLn (n being a natural number greater than 1) in response to the second control signal S2.

For example, the gate driver 240 may output gate driving signals G1 to Gn (n being a natural number greater than 1) to the gate lines GL to GLn (n being a natural number greater than 1) in response to the second control signal S2. According to the gate driving signals G1 to Gn (n being a natural number greater than 1), the transistors TR in the display pixels connected to a corresponding gate line may be turned on or off.

The touch sensing unit 250 may provide a driving signal to the common electrodes CE11 to CEij (i and j each being a natural number greater than 1) during a touch sensing operation (or touch sensing mode) in period Pt (see, e.g., FIG. 9) and detect a signal received from the common electrodes CE11 to CEij (i and j each being a natural number greater than 1) according to the change in self-capacitance of the common electrodes CE11 to CEij (i and j each being a natural number greater than 1) due to touch or according to the change in mutual-capacitance between the common electrodes.

Referring to FIG. 9, the panel 210 may further include the sensing lines L11 to Lnm connected to the common electrodes CE11 to CEij (i and j each being a natural number greater than 1).

The equalizer 260 may short-circuit two or more of the sensing lines L11 to Lnm (n and m each being a natural number greater than 1). For example, the equalizer 260 may short-circuit two adjacent sensing lines of the sensing lines L11 to Lnm (n and m each being a natural number greater than 1) during the second time period P2 (see FIG. 10).

The equalizer 260 may include a plurality of switch circuits 260-1 to 260-*m* (m being a natural number greater than 1). Each of the switch circuits 260-1 to 260-*m* (m being a natural number greater than 1) may short-circuit the sensing lines connected to the sensing nodes in one of columns of the panel 210. Each of the switch circuits 260-1 to 260-*m* (m being a natural number greater than 1) may include a plurality of switches.

The description of the equalizers 130 and 130*a* of FIGS. 1 to 3 may be applied to the equalizer 260 of FIG. 8. In addition, the description of the switch circuits 131-1 to 131-*m* of FIGS. 1 and 2 may be applied to the switch circuits 260-1 to 260-*m* (m being a natural number greater than 1).

The touch sensing unit 250 may further include a driving signal generator for generating a driving signal, a driving signal provider for providing a driving signal to the sensing lines L11 to Lnm (n and m each being a natural number greater than 1), a panel capacitor, and the sensing terminals 251-1 to 251-*n* (n being a natural number greater than 1). In addition, the touch sensing unit 250 may further include a digital-to-analog converter, and a digital signal processor.

The description of the touch sensing unit 120, the driving signal generators 410-1 to 410-*n*, the driving signal providers 420-1 to 420-*n*, and the panel capacitor of FIGS. 1 and 4 may be applied to the touch sensing unit 250 of FIG. 8 in the same way.

Figure 11:
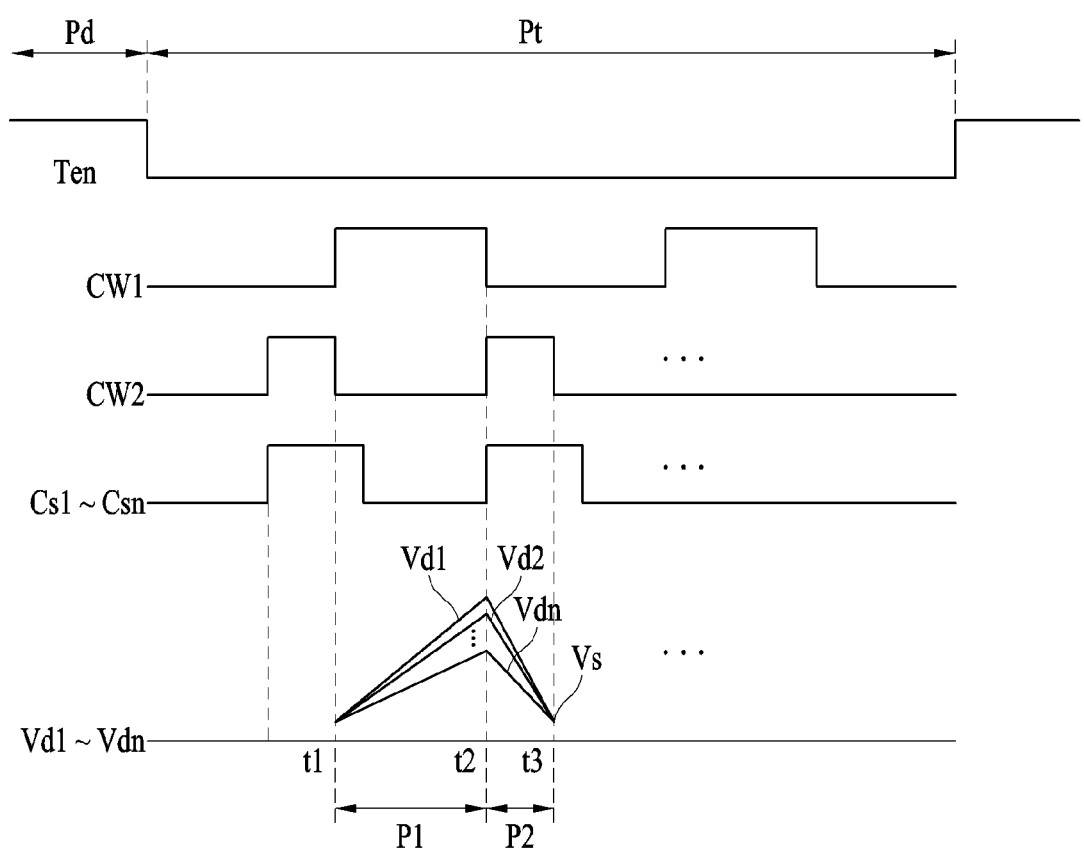
FIG. 11 is a timing diagram of the exemplary first and second switch control signals, sharing control signals, and charged voltages of the touch sensor illustrated in FIG. 8, according to one or more embodiments of the present invention.

FIG. 11 is a timing diagram of the exemplary first and second switch control signals CW1 and CW2, the sharing control signals Cs1 to Csn, and the voltages Vd1 to Vdn of the touch sensing unit 250 illustrated in FIG. 8, according to one or more embodiments of the present invention.

Referring to FIG. 11, according to a display enable signal Ten, the display period Pd and the touch sensing period Pt may be differentiated.

The first time period P1 and the second time period P2 that are described with reference to FIG. 5 may be present in the touch sensing period Pt. The description of FIG. 5 may apply to the timing diagram of the first and second switch control signals CW1 and CW2 and the sharing control signals Cs1 to Csn for charging, discharging, and equalization or sharing operations for a sensing node of the panel 210. For example, the common electrodes CE11 to CEij (i and j each being a natural number greater than 1) may be charged, discharged, and/or equalized in the touch sensing period Pt.

Figure 12:
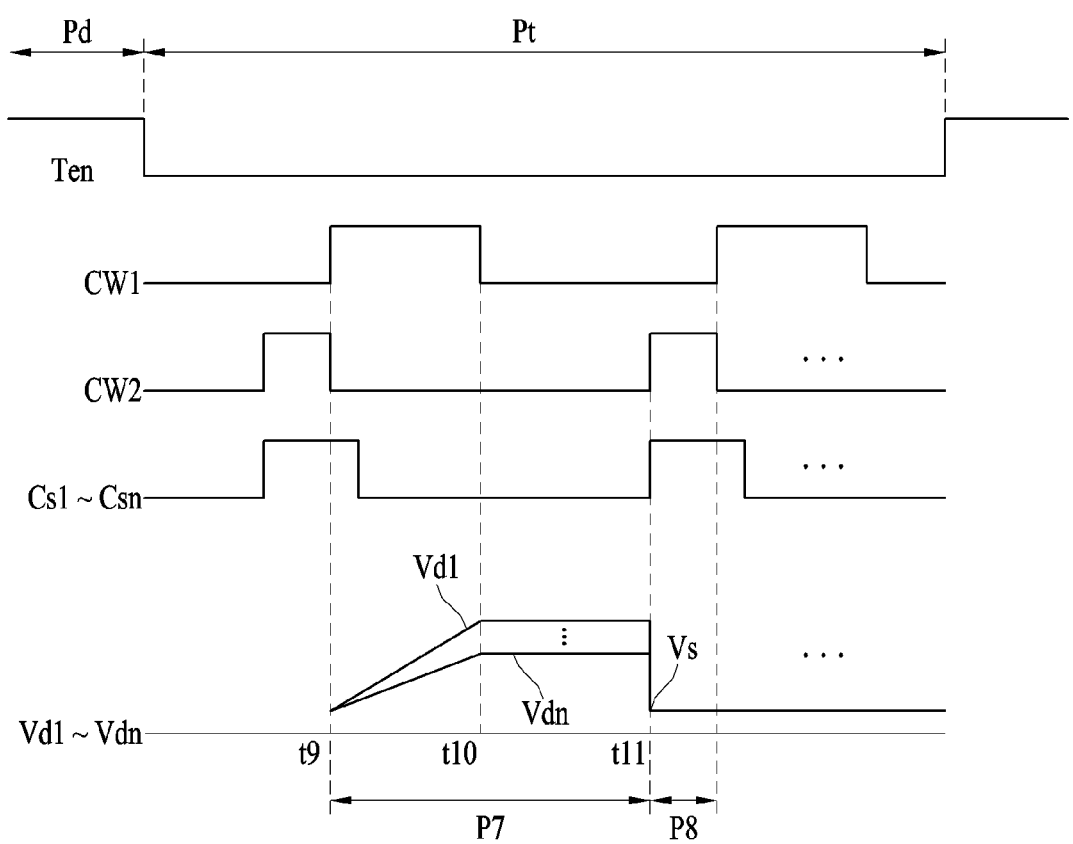
FIG. 12 is an alternative timing diagram of the exemplary first and second switch control signals, sharing control signals, and charged voltages of the touch sensor illustrated in FIG. 8.

FIG. 12 is a timing diagram of the exemplary first and second switch control signals CW1 and CW2, the sharing control signals Cs1 to Csn, and the voltages Vd1 to Vdn of the touch sensing unit 250 illustrated in FIG. 8.

Referring to FIG. 12, the first time period P4 and the second time period P6 described with reference to FIG. 6 may be present in the touch sensing period Pt. The description of FIG. 6 may be applied to the timing diagram of the first and second switch control signals CW1 and CW2 and the sharing control signals Cs1 to Csn for charging, discharging, and equalization or sharing operations for a sensing node of the panel 210. For example, the common electrodes CE11 to CEij (i and j each being a natural number greater than 1) may be charged, discharged, and/or equalized in the touch sensing period Pt.

The equalizer 260 may further include the connection switches 301-1 to 301-$m$ described with reference to FIG. 3. The connection switches 301-1 to 301-$m$ of the equalizer 260 may be connected between one of the sensing lines connected to the sensing nodes corresponding to one of the plurality of columns of the panel 210 and one of the sensing lines connected to the sensing nodes corresponding to another one of the plurality of columns. The description of the connection switches 301-1 to 301-$m$ of the equalizer 130$a$ of FIG. 3 may also be applied to a connection switch of the equalizer 260.

Figure 13:
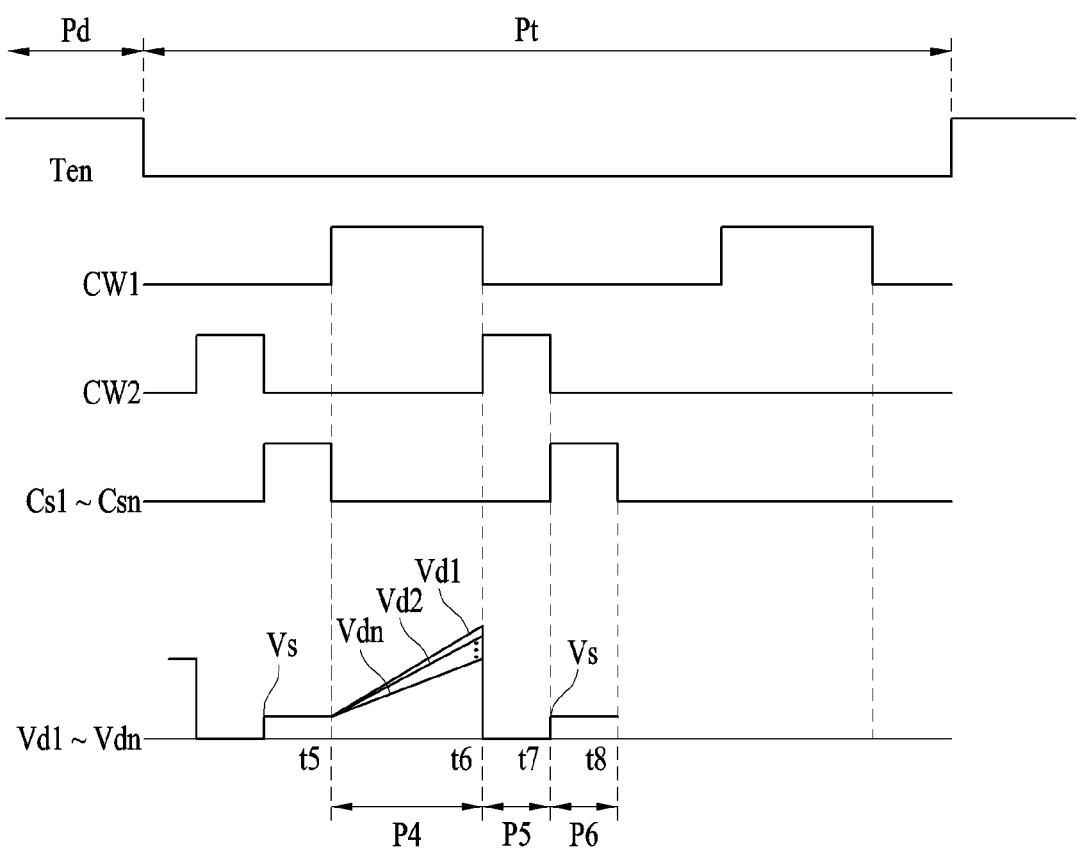
FIG. 13 is an alternative timing diagram of the exemplary first and second switch control signals, sharing control signals, and charged voltages of the touch sensor illustrated in FIG. 8, according to further one or more other embodiments of the present invention.

FIG. 13 is a timing diagram of the exemplary first and second switch control signals CW1 and CW2, the sharing control signals Cs1 to Csn, and the charged voltages Vd1 to Vdn of the touch sensing unit 250 illustrated in FIG. 8, according to one or more embodiments of the present invention.

Referring to FIG. 13, the first time period P7 and the second time period P8 described with reference to FIG. 7 may be present in the touch sensing period Pt. The description of FIG. 7 may be applied to the timing diagram of the first and second switch control signals CW1 and CW2 and the sharing control signals Cs1 to Csn for charging, discharging, and equalization or sharing operations for a sensing node of the panel 210. For example, the common electrodes CE11 to CEij (i and j each being a natural number greater than 1) may be charged, discharged, and/or equalized in the touch sensing period Pt.

The display apparatus 200 of FIG. 8 uses common electrodes that are display electrodes and sensing electrodes, without being limited thereto. According to one or more embodiments of the present invention, various types of other display electrodes, such as a gate electrode, a source element, or a pixel electrode, may be used as a sensing electrode.

In order to reduce parasitic capacitance between a sensing electrode and the display electrodes, a guarding signal may be provided to at least one display electrode other than the sensing electrode during the sensing period.

For example, a difference between the guarding signal and the touch driving signal may be constant.

For example, the guarding signal may be the same as the touch driving signal.

For example, at least one of a frequency, a phase, a shape and/or an amplitude of the touch driving signal may be the same as that of the guarding signal.

As described above, when a number of cycles or instances of a touch operation are completed during the touch operation, charges on the sensing nodes CE11 to CEnm are discharged, and in this regard, the sensing lines of each column of the panel 210 may be short-circuited prior to a next touch. Thus, according to one or more embodiments of the present invention, an initial state between sensing lines of each column, such as amplitudes and/or initial voltages, may be equalized, thereby enhancing sensitivity and accuracy of touch sensing.

According to embodiments of the present invention, the sensitivity and accuracy of touch sensing may be enhanced.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A touch sensor comprising:
a touch panel comprising a plurality of sensing nodes in columns and rows and sensing lines connected to the sensing nodes;
a touch sensing unit configured to provide a driving signal to at least one of the sensing lines to charge at least one of the sensing nodes during a first time period and discharge a voltage on the sensing nodes during a second period, wherein the touch sensing unit comprises a driving signal generator configured to generate the driving signal, a first switch connected between the driving signal generator and the sensing lines, and a second switch connected between the sensing lines and a ground potential, the first switch is turned on in response to a first switch control signal and the second switch is turned off in response to a second switch control signal during the first period, and the first switch is turned off in response to the first switch control signal and the second switch is turned on in response to the second switch control signal during the second period; and
an equalizer configured to short-circuit the sensing lines during the second time period.

2. The touch sensor according to claim 1, wherein the driving signal is a cyclic or periodic signal.

3. The touch sensor according to claim 1, wherein the first time period is a length of time during which the sensing nodes are charged by the driving signal.

4. The touch sensor according to claim 1, wherein discharging the voltages on the sensing nodes and short-circuiting the sensing lines are simultaneously performed during the second period.

5. The touch sensor according to claim 1, wherein discharge of the voltages on the sensing nodes and short-circuit of the sensing lines are sequentially performed in the second period.

6. The touch sensor according to claim 1, wherein the touch sensing unit comprises a sensing end configured to sample a voltage on the sensing node connected to a corresponding one of the sensing lines and perform a sensing operation using the sampled voltage.

7. The touch sensor according to claim 1, wherein the equalizer short-circuits two adjacent ones of the sensing lines during the second period.

8. The touch sensor according to claim 1, wherein the equalizer further comprises a connection switch configured to short-circuit one of the sensing lines corresponding to one of the columns and another one of the sensing lines corresponding to another one of the columns during the second period.

9. The touch sensor according to claim 1, wherein the first and second periods are sequential and/or consecutive.

10. The touch sensor according to claim 1, wherein the equalizer comprises charge-sharing switches configured to short-circuit two adjacent ones of the sensing lines in response to one or more sharing control signals.

11. The touch sensor according to claim 10, wherein a turn-off or stop time of the charge-sharing switches is later than turn-off or stop time of the second switch.

12. A display apparatus comprising:
a panel driver configured to time-divide a display operation and a touch sensing operation during a frame; and
a touch sensing unit configured to provide a driving signal to at least one sensing line of a plurality of sensing lines to charge at least one sensing node during a first time period and discharge a voltage on the sensing node during a second period, wherein the touch sensing unit comprises a driving signal generator configured to generate the driving signal, a first switch connected between the driving signal generator and the sensing lines, and a second switch connected between the sensing lines and a ground potential, the first switch is turned on in response to a first switch control signal and the second switch is turned off in response to a second switch control signal during the first period, and the first switch is turned off in response to the first switch control signal and the second switch is turned on in response to the second switch control signal during the second period; and
an equalizer configured to short-circuit the sensing lines in the second time period.

13. The display apparatus according to claim 12, wherein the driving signal is a cyclic or periodic signal.

14. The display apparatus according to claim 12, wherein the first time period is a length of time during which the sensing node is charged by the driving signal.

15. The display apparatus according to claim 12, wherein:
the panel comprises a plurality of display electrodes configured to drive and display pixels connected to the display electrodes; and
the sensing node is one of the display electrodes.

16. The display apparatus according to claim 15, further comprising a guarding signal provided to at least one other display electrode other than the sensing node during the touch sensing operation.

17. The display apparatus according to claim 16, wherein the guarding signal is the same as the driving signal.

18. The display apparatus according to claim 12, further comprising:
a data driver configured to drive the data lines; and
a gate driver configured to drive the gate lines.

* * * * *